(12) United States Patent
Fimoff et al.

(10) Patent No.: US 7,177,354 B2
(45) Date of Patent: Feb. 13, 2007

(54) METHOD AND APPARATUS FOR THE CONTROL OF A DECISION FEEDBACK EQUALIZER

(75) Inventors: Mark Fimoff, Hoffman Estates, IL (US); William Hillery, Lafayette, IN (US); Sreenivasa M. Nerayanuru, Wheeling, IL (US); Serdar Ozen, Vernon Hills, IL (US); Christopher J. Pladdy, Chicago, IL (US); Michael D. Zoltowski, West Lafayette, IN (US)

(73) Assignee: Zenith Electronics Corporation, Lincolnshire, IL (US)

( * ) Notice: Subject to any disclaimer, the term of this patent is extended or adjusted under 35 U.S.C. 154(b) by 508 days.

(21) Appl. No.: 10/421,014

(22) Filed: Apr. 22, 2003

(65) Prior Publication Data

US 2004/0213341 A1 Oct. 28, 2004

(51) Int. Cl.
 H03H 7/30 (2006.01)
 H03K 5/159 (2006.01)
 H04N 5/00 (2006.01)

(52) U.S. Cl. .................. 375/233; 375/231; 375/232; 348/607

(58) Field of Classification Search ............... 375/231, 375/232, 233, 350; 708/322, 323; 348/607, 348/725, 726, 614
See application file for complete search history.

(56) References Cited

U.S. PATENT DOCUMENTS

| 5,155,742 | A | 10/1992 | Ariyavisitakul et al. |
| 6,012,161 | A * | 1/2000 | Ariyavisitakul et al. ..... 714/795 |
| 6,349,112 | B1 | 2/2002 | Shibata |
| 6,459,728 | B1 * | 10/2002 | Bar-David et al. .......... 375/231 |
| 6,724,844 | B1 * | 4/2004 | Ghosh ......................... 375/350 |
| 6,934,345 | B2 * | 8/2005 | Chu et al. ................... 375/346 |
| 7,038,731 | B2 * | 5/2006 | Tsuie .......................... 348/607 |
| 2002/0021750 | A1 * | 2/2002 | Belotserkovsky et al. .. 375/232 |
| 2002/0172275 | A1 * | 11/2002 | Birru ........................... 375/233 |
| 2003/0081668 | A1 * | 5/2003 | Yousef et al. ............... 375/232 |
| 2003/0161415 | A1 * | 8/2003 | Krupka ........................ 375/350 |

FOREIGN PATENT DOCUMENTS

| EP | 1 014 635 A2 | 6/2000 |
| EP | 1 081 905 A2 | 3/2001 |
| WO | WO 99/49586 | 9/1999 |

OTHER PUBLICATIONS

Borah et al., "Decision Feedback Equalization in Time-Varying Frequency-Selective Channels", Fifth International Symposium on Signal Processing and its Applications, ISSPA '99, Brisbane, Australia, Aug. 22-25, 1999, pp. 403-406.

(Continued)

Primary Examiner—Betsy L. Deppe (57) ABSTRACT

The tap weights of an equalizer are initialized in response to a received relatively short training sequence, and new tap weights for the equalizer are thereafter successively calculated in response to relatively long sequences of received symbols and corresponding sequences of decoded symbols. These new tap weights are successively applied to the equalizer.

52 Claims, 2 Drawing Sheets

OTHER PUBLICATIONS

ATSC, Digital Television Standard (Annex D), Sep. 16, 1995, pp. 46-60.

Özen et al., "Structured Channel Estimation Based Decision Feedback Equalizers for Sparse Multipath Channel with Applications to Digital TV Receivers", Jul. 15, 2002, SAM 2002.

Al-Dhahir et al., "Fast Computation of Channel-Estimate Based Equalizers in Packet Data Transmission", IEEE Transactions on Signal Processing, vol. 43, No. 11, Nov. 1995, pp. 2462-2473.

Zoltowski et al., "Conjugate-gradient-based decision feedback equalization with structured channel estimation for digital television", Proceedings of SPIE vol. 4740, (2002), pp. 95-105.

M.V. Eyuboğlu, "Detection of Coded Modulation Signals on Linear, Severly Distorted Channels Using Decision-Feedback Noise Prediction with Interleaving", IEEE Transactions on Communications, vol. 36, No. 4, Apr. 1988, pp. 401-409.

S. L. Ariyavisitakul et al., "Joint Coding and Decision Feedback Equalization for Broadband Wireless Channels", IEEE Journal of Selected Areas in Communications, vol. 16, No. 9, Dec. 1998, pp. 1670-1678.

D. J. Kim et al., "Fast Equalization Techniques Based on Kalman Algorithms to Improve Mobile Reception Performance of 8-VSB Receivers", ICCE 2002, Jun. 2002, pp. 286-287.

* cited by examiner

METHOD AND APPARATUS FOR THE CONTROL OF A DECISION FEEDBACK EQUALIZER

TECHNICAL FIELD OF THE INVENTION

The present invention relates to equalizers and, more particularly, to equalizers that adapt to the condition of a channel through which signals are received.

BACKGROUND OF THE INVENTION

Since the adoption of the ATSC digital television (DTV) standard in 1996, there has been an ongoing effort to improve the design of receivers built for the ATSC DTV signal. The primary obstacle that faces designers in designing receivers so that they achieve good reception is the presence of multipath interference in the channel. Such multipath interference affects the ability of the receiver to recover signal components such as the carrier and symbol clock. Therefore, designers add equalizers to receivers in order to cancel the effects of multipath interference and thereby improve signal reception.

The broadcast television channel is a relatively severe multipath environment due to a variety of conditions that are encountered in the channel and at the receiver. Strong interfering signals may arrive at the receiver both before and after the largest amplitude signal. In addition, the signal transmitted through the channel is subject to time varying channel conditions due to the movement of the transmitter and signal reflectors, airplane flutter, and, for indoor reception, people walking around the room. If mobile reception is desired, movement of the receiver must also be considered.

The ATSC DTV signal uses a 12-phase trellis coded 8-level vestigial sideband (usually referred to as 8T-VSB or, more simply, as 8-VSB) as the modulation method. There are several characteristics of the 8-VSB signal that make it special compared to most linear modulation methods (such as QPSK or QAM) that are currently used for wireless transmission. For example, 8-VSB data symbols are real and have a signal pulse shape that is complex. Only the real part of the complex pulse shape is a Nyquist pulse. Therefore, the imaginary part of the complex pulse shape contributes intersymbol interference (ISI) when the channel gain seen by the equalizer is not real, even if there is no multipath.

Also, due to the low excess bandwidth, the signal is nearly single sideband. As a result, symbol rate sampling of the complex received signal is well above the Nyquist rate. Symbol rate sampling of the real or imaginary part of the received signal is just below the Nyquist rate.

Because the channel is not known a priori at the receiver, the equalizer must be able to modify its response to match the channel conditions that it encounters and to adapt to changes in those channel conditions. To aid in the convergence of an adaptive equalizer to the channel conditions, the field sync segment of the frame as defined in the ATSC standard may be used as a training sequence for the equalizer. But when equalization is done in the time domain, long equalizers (those having many taps) are required due to the long channel impulse responses that characterize the channel. Indeed, channels are often characterized by impulse responses that can be several hundreds of symbols long.

The original Grand Alliance receiver used an adaptive decision feedback equalizer (DFE) with 256 taps. The adaptive decision feedback equalizer was adapted to the channel using a standard least mean square (LMS) algorithm, and was trained with the field sync segment of the transmitted frame. Because the field sync segment is transmitted relatively infrequently (about every 260,000 symbols), the total convergence time of this equalizer is quite long if the equalizer only adapts on training symbols prior to convergence.

In order to adapt equalizers to follow channel variations that occur between training sequences, it had been thought that blind and decision directed methods could be added to equalizers. However, when implemented in a realistic system, these methods may require several data fields to achieve convergence, and convergence may not be achieved at all under difficult multipath conditions.

In any event, because multipath signals in the broadcast channel may arrive many symbols after the main signal, the decision feedback equalizer is invariably used in 8-VSB applications. However, it is well known that error propagation is one of the primary drawbacks of the decision feedback equalizer. Therefore, under severe multipath conditions, steps must be taken to control the effect of error propagation.

In a coded system, it is known to insert a decoder into the feedback path of the decision feedback equalizer to use the tentative decision of the decoder in adapting the equalizer to channel conditions. This method, or a variant of it, is applicable to the 8-VSB signal by way of the output of the trellis decoder. As discussed above, the ATSC DTV signal is a 12-phase trellis coded digital vestigial sideband signal with 8 signal levels known as 8T-VSB.

Figure 1:
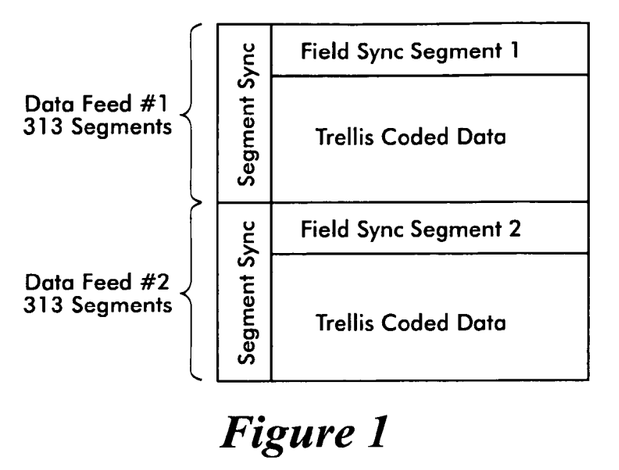
FIG. 1 illustrates a data frame according to the ATSC DTV standard.

In ATSC DTV systems, data is transmitted in frames as shown in FIG. 1. Each frame contains two data fields, each data field contains 313 segments, and each segment contains 832 symbols. The first four of these symbols in each segment are segment sync symbols having the sequence [+5, −5, −5, +5].

Figure 2:
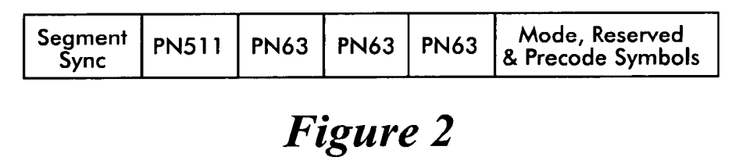
FIG. 2 illustrates the field sync segment of the fields comprising the frame of FIG. 1.

The first segment in each field is a field sync segment. As shown in FIG. 2, the field sync segment comprises the four segment sync symbols discussed above followed by a pseudo-noise sequence having a length of 511 symbols (PN511) followed in turn by three pseudo-noise sequences each having a length of 63 symbols (PN63). Like the segment sync symbols, all four of the pseudo-noise sequences are composed of symbols from the set {+5, −5}. In alternate fields, the three PN63 sequences are identical; in the remaining fields, the center PN63 sequence is inverted. The pseudo-noise sequences are followed by 128 symbols, which are composed of various mode, reserved, and precode symbols.

Because the first 704 symbols of each field sync segment are known, these symbols, as discussed above, may be used as a training sequence for an adaptive equalizer. All of the three PN63 sequences can be used only when the particular field being transmitted is detected so that the polarity of the center sequence is known. The remaining data in the other 312 segments comprises trellis coded 8-VSB symbols. This data, of course, is not known a-priori by the receiver.

Figure 3:
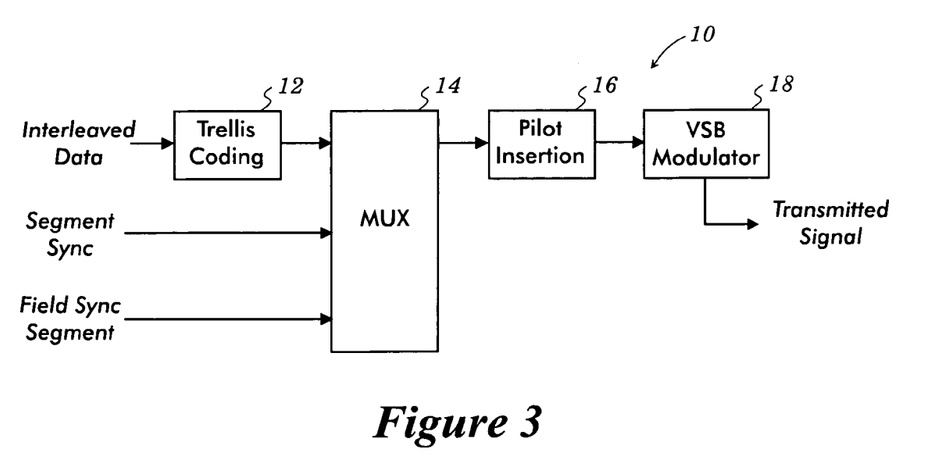
FIG. 3 illustrates a portion of a transmitter relevant to the transmitting of an 8T-VSB signal.

A transmitter 10 for transmitting the 8T-VSB signal is shown at a very high level in FIG. 3. The transmitted baseband 8T-VSB signal is generated from interleaved Reed-Solomon coded data. After trellis coding by a trellis encoder 12, a multiplexer 14 adds the segment sync symbols and the field sync segment to the trellis coded data at the appropriate times in the frame. A pilot inserter 16 then inserts a pilot carrier by adding a DC level to the baseband signal, and a modulator 18 modulates the resulting symbols. The modulated symbols are transmitted as a vestigial sideband (VSB) signal at a rate of 10.76 MHz.

Figure 4:
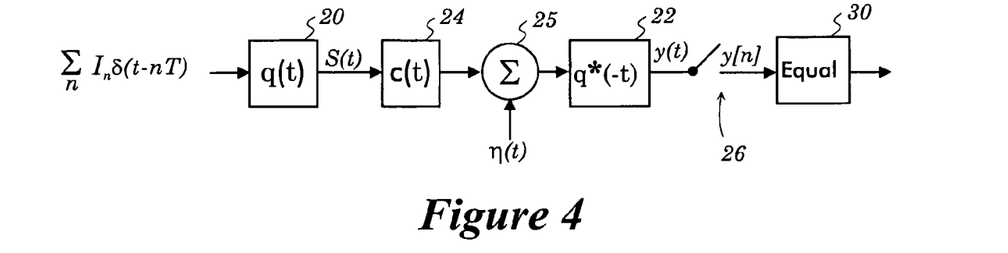
FIG. 4 illustrates portions of a transmitter and receiver relevant to the present invention; and, FIG. 5 illustrates a tracking decision feedback equalizer system according to an embodiment of the present invention.

FIG. 4 shows the portions of the transmitter and receiver relevant to the analysis presented herein. The transmitted signal has a raised cosine spectrum with a nominal bandwidth of 5.38 MHz and an excess bandwidth of 11.5% of the nominal bandwidth centered at one-fourth of the symbol rate (i.e., 2.69 MHz). Thus, the transmitted pulse shape q(t) (block 20, FIG. 4) is complex and is given by the following equation:

$$q(t) = e^{j\pi t F_S/2} q_{RRC}(t) \quad (1)$$

where $F_S$ is the symbol frequency, and $q_{RRC}(t)$ is a real square root raised cosine pulse with an excess bandwidth of 11.5% of the channel. Thus, the pulse q(t) is a complex root raised cosine pulse.

The baseband transmitted signal waveform of data rate 1/T symbols/sec is represented by the following equation:

$$s(t) = \sum_k I_k q(t - kT) \quad (2)$$

where $\{I_k \in A \equiv \{\alpha_1, \ldots \alpha_8\} \subset R^1\}$ is the transmitted symbol sequence, which is a discrete 8-ary sequence taking values on the real 8-ary alphabet A. The function q(t) is the transmitter's pulse shaping filter of finite support $[-T_q/2, T_q/2]$. The overall complex pulse shape at the output of the matching filter in the receiver is denoted p(t) and is given by the following equation:

$$p(t) = q(t) * q^*(-t) \quad (3)$$

where q*(−t) (block 22, FIG. 4) is the receiver matched filter impulse response.

Although it is not required, it may be assumed for the sake of simplifying the notation that the span $T_q$ of the transmit filter and the receive filter is an integer multiple of the symbol period T; that is, $T_q = N_q T = 2L_q T$, $L_q$ is a real integer greater than zero. For the 8-VSB system, the transmitter pulse shape is the Hermitian symmetric root raised cosine pulse, which implies that $q(t) = q^*(-t)$. Therefore, $q[n] \equiv q(t)|_{t=nT}$ is used below to denote both the discrete transmit filter and discrete receive filter.

The physical channel between the transmitter and the receiver is denoted c(t) (block 24, FIG. 4). The concatenation of p(t) and the channel is denoted h(t) and is given by the following equation:

$$h(t, \tau) = q(t) * c(t, \tau) * q^*(-t) = p(t) * c(t, \tau) \quad (4)$$

The physical channel $c(t, \tau)$ is generally described as a time varying channel by the following impulse response:

$$c(t, \tau) = \sum_{k=-D_{ha}}^{D_{hc}} c_k(\tau) \delta(t - \tau_k) \quad (5)$$

where $\{c_k(\tau)\} \subset C^1$, and where $-D_{ha} \leq k \leq D_{hc}$, $t, \tau \in R$, and $\{\tau_k\}$ denote the multipath delays, or the time of arrivals (TOA), and where δ(t) is the Dirac delta function. It is assumed that the time variations of the channel are slow enough that $c(t,\tau) = c(t)$. Thus, the channel is assumed to be a fixed (static) inter-symbol interference channel throughout the training period such that $c_k(\tau) = c_k$, which in turn implies the following equation:

$$c(t) = \sum_{k=-D_{ha}}^{D_{hc}} c_k \delta(t - \tau_k) \quad (6)$$

for $0 \leq t \leq L_n T$, where $L_n$ is the number of training symbols, and the summation indices $D_{ha}$ and $D_{hc}$ refer to the number of maximum anti-causal and causal multipath delays, respectively.

In general, $c_k = \tilde{c}_k e^{-j2\pi f_c \tau_k}$ where $\tilde{c}_k$ is the amplitude of the k'th multipath, and $f_c$ is the carrier frequency. It is also inherently assumed that $\tau_k < 0$ for $-D_{ha} \leq k \leq -1$, $\tau_0 = 0$, and $\tau_k > 0$ for $1 \leq k \leq D_{hc}$. The multipath delays $\tau_k$ are not assumed to be at integer multiples of the sampling period T.

Equations (4) and (6) may be combined according to the following equation (where the τ index has been dropped):

$$h(t) = p(t) * c(t) = \sum_{-D_{ha}}^{D_{hc}} c_k p(t - \tau_k) \quad (7)$$

Because both p(t) and c(t) are complex valued functions, the overall channel impulse response h(t) is also complex valued. By using the notation introduced herein, the matched filter output y(t) in the receiver is given by the following equation:

$$y(t) = \left( \sum_k I_k \delta(t - kT) \right) * h(t) + v(t) \quad (8)$$

where $$v(t) = \eta(t) * q^*(-t) \quad (9)$$

denotes the complex (colored) noise process after the pulse matched filter 22, with η(t) being a zero-mean complex white Gaussian noise process with spectral density $\sigma_\eta^2$ per real and imaginary part (see summer 25). The matched filter output data y(t) can also be written in terms of its real and imaginary parts as $y(t) = y_I(t) + jy_Q(t)$.

Sampling the matched filter output y(t) (sampler 26, FIG. 4) at the symbol rate produces the discrete time representation of the overall communication system according to the following equation:

$$y[n] \equiv y(t)|_{t=nT} = \sum_k I_k h[n-k] + v[n] \quad (10)$$

where y[n] are the received data samples. Prior art equalizers have known problems previously discussed, such as difficulty converging under severe multipath conditions.

The present invention provides a novel technique to provide improved convergence time of equalizers and/or to solve other problems associated with equalizers.

SUMMARY OF THE INVENTION

In accordance with one aspect of the present invention, a method of operating an equalizer comprises the following: initializing the tap weights of the equalizer in response to a received relatively short training sequence; successively calculating new tap weights for the equalizer in response to relatively long sequences of received data and corresponding sequences of decoded symbols; and, successively applying the calculated new tap weights to the equalizer.

In accordance with another aspect of the present invention, a tracking decision equalizer system comprises an equalizer, a decoder, and first and second tap weight calculators. The equalizer has taps with tap weights. The decoder decodes an output of the equalizer to recover decoded symbols. The first tap weight calculator calculates and applies the tap weights to the equalizer based upon a first estimate of a channel impulse response determined from a relatively short training sequence. The second tap weight calculator successively calculates and applies the tap weights to the equalizer based upon successive second estimates of a channel impulse response determined from successive relatively long sequences of the decoded symbols. Each of the sequences of the decoded symbols is longer than the training sequence.

In accordance with still another aspect of the present invention, a method of operating an equalizer comprises the following: initializing the tap weights of the equalizer in response to a training sequence, wherein the training sequence is derived from a frame sync segment of an ATSC compliant frame; successively calculating new tap weights for the equalizer in response to sequences of decoded symbols, wherein each sequence of decoded symbols includes the symbols in n data segments of the ATSC compliant frame, and wherein n>1; and, successively applying the calculated new tap weights to the equalizer.

BRIEF DESCRIPTION OF THE DRAWINGS

These and other features and advantages will become more apparent from a detailed consideration of the invention when taken in conjunction with the drawings in which.

DETAILED DESCRIPTION

Figure 5:
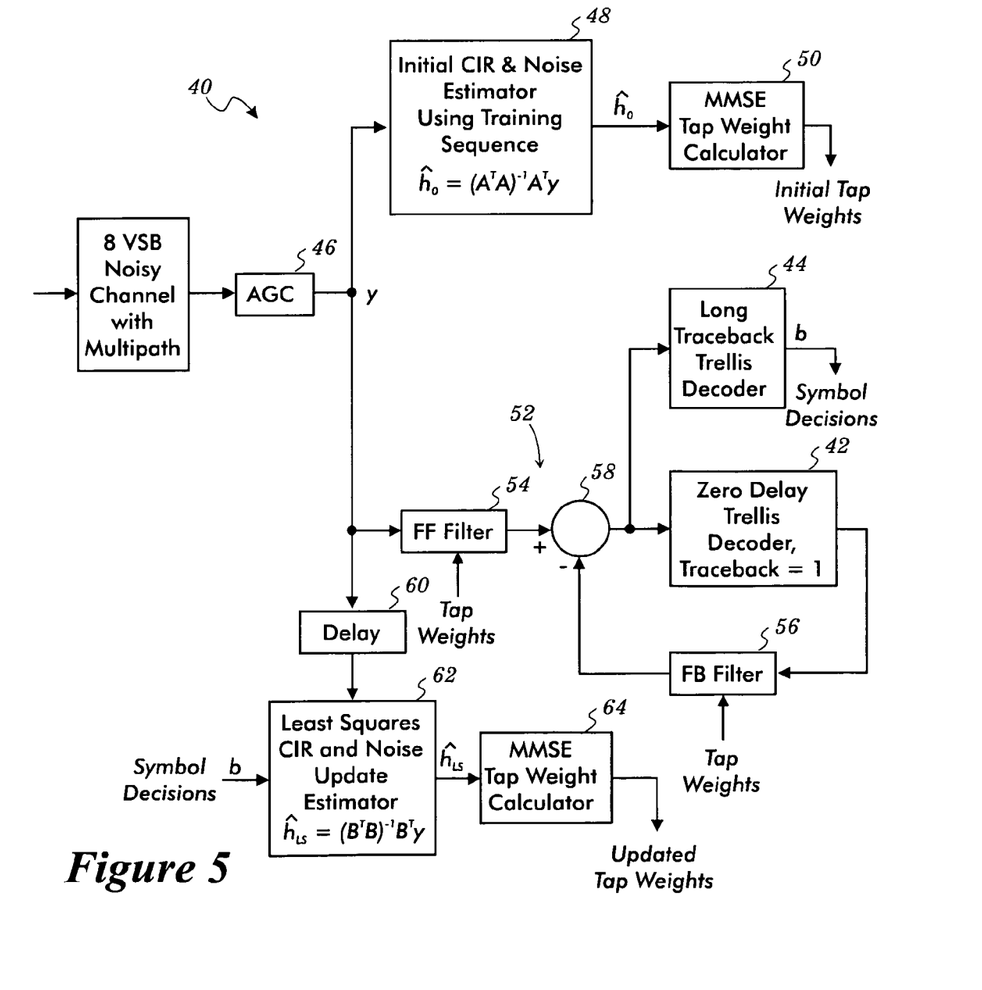

FIG. 5 illustrates a decision feedback equalizer system 40 that avoids and/or mitigates the convergence and/or tracking problems of previous decision feedback equalizers. The tap weights are calculated based on estimates of the channel impulse response. This arrangement makes use of two 12-phase trellis decoders 42 and 44. The 12-phase trellis decoder 42 has a short traceback depth, and the 12-phase trellis decoder 44 has a long traceback depth.

The signal from the channel is processed by an automatic gain controller 46, which provides the output y. An initial channel impulse response and noise estimator 48 uses the training sequence to provide an initial estimate $\hat{h}_0$ of the channel impulse response. A tap weight calculator 50 calculates an initial set of tap weights based on the initial estimate $\hat{h}_0$ of the channel impulse response using, for example, a MMSE based algorithm, and supplies this initial set of tap weights to a decision feedback equalizer 52 comprising a feed forward filter 54 and a feedback filter 56.

The decision feedback equalizer 52 equalizes the data contained in the output y based on these initial tap weights and includes a summer 58 which supplies the output of the decision feedback equalizer 52 to the short traceback 12-phase trellis decoder 42 and the long traceback 12-phase trellis decoder 44. The output of the long traceback 12-phase trellis decoder 44 forms the symbol decisions b. The feedback filter 56 filters the output of the short traceback 12-phase trellis decoder 42, and the filtered output of the feedback filter 56 is subtracted by the summer 58 from the output of the feed forward filter 54.

The output y is delayed by a delay 60, and the delayed output y and the symbol decisions b are processed by a least squares channel impulse and noise update estimator 62 that produces an updated channel impulse estimate $\hat{h}_{LS}$. A tap weight calculator 64 uses the updated channel impulse estimate $\hat{h}_{LS}$ to calculate an updated set of tap weights for the decision feedback equalizer 52. The tap weights determined by the tap weight calculator 64 are provided to the decision feedback equalizer 52 during periods when the tap weights based on the training sequence are not available. The delay imposed by the delay 60 is equal to the delay of the decision feedback equalizer 52 and of the long traceback 12-phase trellis decoder 44.

In a transmitter according to the ATSC standard, 8 VSB data symbols are trellis coded utilizing a 12-phase coding technique. Most commonly, a decision feedback equalizer in an 8 VSB receiver is expected to use an 8 level slicer for a symbol decision device in the feedback loop of the decision feedback equalizer. However, the use of an 8 level slicer may result in many symbol decision errors being fed to the feedback filter when the channel has significant multipath distortion or a low signal to noise ratio. These errors give rise to further errors resulting in what is called error propagation within the decision feedback equalizer. This error propagation greatly degrades the performance of the decision feedback equalizer.

Because the data symbols in an 8 VSB system are trellis coded, trellis decoding can be used in the symbol decision device in order to reduce the number of symbol decision errors. The reliability of a trellis decoder is proportional to its traceback depth. Trellis decoders with a longer traceback depth produce more reliable decisions, but the decision process then incurs a longer delay. On the other hand, a zero delay trellis decoder can be constructed having a traceback depth of one. While the symbol decisions of the zero delay trellis decoder are less reliable than a trellis decoder with a longer delay, the zero delay trellis decoder is still significantly more reliable than an 8 level slicer.

It is well known that, if a symbol decision device with a delay greater than zero is used as the symbol decision device for a decision feedback equalizer, a problem is created with respect to cancellation of short delay multipath. Therefore, decision feedback equalizers for 8 VSB receivers with a zero delay 12-phase trellis decoder in the feedback loop have been described for reducing error propagation. That method is used in one embodiment of the present invention.

The output of the decision feedback equalizer 52 is fed to the long traceback depth 12-phase trellis decoder 44 (i.e., a long delay trellis decoder having, for example, a traceback depth=32 and a delay=12×31=372 symbols). The long traceback depth 12-phase trellis decoder 44, whose decisions are more reliable than those of the short traceback depth 12-phase trellis decoder 42, provides the final symbol decisions for subsequent receiver stages. Also, the long traceback depth 12-phase trellis decoder 44 provides the symbol decisions used by the least squares channel impulse and noise update estimator 62, whose output is in turn used by the tap weight calculator 64 for calculating updated tap weights for the decision feedback equalizer 52 so that the decision feedback equalizer 52 can follow channel impulse response variations that occur between training sequences.

At initialization, the initial channel impulse response estimate $\hat{h}_0$ is formed from the received training sequence by the initial channel impulse response and noise estimator 48, and an initial set of tap weights are calculated by the tap weight calculator 50 from that channel impulse response estimate $\hat{h}_0$. Then, as the decision feedback equalizer 52 runs, reliable symbols decisions are taken from the long traceback 12-phase trellis decoder 44 and are used as the decoded output.

Also, relatively long pseudo training sequences b are formed from the output of the long traceback 12-phase trellis decoder 44. These long pseudo training sequences are used by the least squares channel impulse and noise update estimator 62 to calculate the updated channel impulse response estimates $\hat{h}_{LS}$, and the tap weight calculator 64 uses the updated channel impulse response estimates $\hat{h}_{LS}$ to calculate updated tap weights for the decision feedback equalizer 52. This procedure allows for the tracking of time varying channel impulse responses.

The initial channel estimate calculated by the initial channel impulse response and noise estimator 48 is based on the received training sequence. Different known methods are available for calculating this initial channel estimate. For example, in a simple version of one of these known methods, the channel impulse response is of length $L_h = L_{ha} + L_{hc} + 1$ where $L_{ha}$ is the length of the anti-causal part of the channel impulse response and $L_{hc}$ is the length of the causal part of the channel impulse response. The length of the training sequence is $L_n$.

A least squares channel impulse response estimate is one choice for the initial estimate of the channel impulse response. A vector a of length $L_n$ of a priori known training symbols is given by the following expression:

$$a = [a_0, \cdots, a_{L_n-1}]^T \quad (11)$$

The vector of received data is given by the following equation:

$$y = [y_{L_{hc}}, \cdots, y_{L_n - L_{ha} - 1}]^T \quad (12)$$

The first received training data element is designated $y_0$. Typically, this would mean that $y_0$ contains a contribution from the first transmitted training symbol multiplied by the maximum magnitude tap of h. Vector y contains a portion of the received training data sequence with no other unknown data, and does not include $y_0$.

A convolution matrix A of size $(L_n - L_{ha} - L_{hc}) \times (L_{ha} + L_{hc} + 1)$ may be formed from the known training symbols as given by the following equation:

$$A = \begin{bmatrix} a_{Lha+Lhc} & a_{Lha+Lhc-1} & \cdots & a_0 \\ a_{Lha+Lhc+1} & a_{Lha+Lhc} & & a_1 \\ - & - & & - \\ - & - & & - \\ - & - & & - \\ a_{Ln-1} & a_{Ln-2} & \cdots & a_{Ln-Lha-Lhc-1} \end{bmatrix} \quad (13)$$

Because the vector y of received data is given by the following equation:

$$y = Ah + v \quad (14)$$

where h is the channel impulse response vector of length $L_h$ and v is a noise vector, the least squares channel impulse response estimate is given by the solution of equation (14) according to the following equation:

$$\hat{h}_\odot = (A^T A)^{-1} A^T y \quad (15)$$

However, this method is only effective if $L_n$ satisfies the following inequality:

$$L_n \geq 2L_h - 1 \quad (16)$$

If the training sequence is too short with respect to the length of the channel impulse response, then this method does not produce a good result because the system of equations (14) to be solved is underdetermined, which is often the case for 8 VSB terrestrial channels. For example, with $L_n = 704$, the channel impulse response must be less than 352 symbols long. However, longer channel impulse responses are commonly found in practice.

A better method for finding the channel impulse response is based on a modified convolution matrix A. A long vector a of length $L_n$ of a priori known training symbols is again given by the expression (11). However, the convolution matrix A this time is an $(L_n + L_{ha} + L_{hc}) \times L_h$ convolution matrix comprising training symbols and zeros and given by the following equation:

$$A = \begin{bmatrix} a_0 & 0 & - & - & - & - & - & 0 \\ - & a_0 & 0 & & & & & - \\ - & & & & & & & - \\ - & & & & 0 & & & 0 \\ a_{Lh-2} & - & - & - & - & - & a_0 & 0 \\ a_{Lh-1} & - & - & - & - & - & - & a_0 \\ - & & & & & & & - \\ - & & & & & & & - \\ - & & & & & & & - \\ a_{Ln-1} & - & - & - & - & - & - & a_{Ln-Lh} \\ 0 & a_{Ln-1} & & & & & & a_{Ln-Lh-1} \\ - & 0 & & & & & & \\ - & & & & & & & \\ - & & & & & & a_{Ln-1} & a_{Ln-2} \\ 0 & - & - & - & - & - & 0 & a_{Ln-1} \end{bmatrix} \quad (17)$$

The vector of received data is given by the following equation:

$$y = [y_{-Lha}, \cdots, y_0, \cdots, y_{Ln+Lhc-1}]^T \quad (18)$$

where $y_0$ through $y_{Ln-1}$ comprises the received training data. So, the vector of equation (18) contains data created by passing known training symbols as well as unknown random symbols before and after the training symbols through the multipath AWGN channel.

Again, equation (14) needs to be solved. Now, the convolution matrix A is a taller matrix because zeros have been substituted for the unknown symbols that surround the training sequence. This new convolution matrix A yields an over-determined system of equations.

The initial channel impulse response and noise estimator 48 solves equation (14) according to equation (15) using the new convolution matrix A of equation (17) and vector y of equation (18) to produce the initial channel impulse response estimate $\hat{h}_0$. More complicated methods may be utilized to give even more accurate results if necessary.

The tap weight calculator 50 uses the initial channel impulse response estimate $\hat{h}_0$ to calculate an initial set of minimum mean square error (MMSE) tap weights for the decision feedback equalizer 52. Methods for calculating minimum mean square error tap weights from a channel impulse response are well known. Alternatively, tap weight calculator 50 may use other methods such as the zero-forcing method to calculate the tap weights.

Accurate channel impulse response estimate updates can also be calculated between training sequences (when only a priori unknown symbols are received). For example, a least squares channel impulse response estimation may be calculated from an over determined system of equations. Dynamic changes to the channel impulse response may be accurately tracked by using receiver trellis decoder decisions on input symbols to form a long sequence of near perfectly decoded symbols. This sequence should have relatively few errors, even near threshold, and is selected to be long enough so that the underdetermined system problem of the "too short" 8 VSB training sequence is eliminated. The channel impulse response may be, for example, updated as often as once per segment (or more or less often).

The updated channel impulse response to be estimated is, as before, of length $L_h = L_{ha} + L_{hc} + 1$ where $L_{ha}$ is the length of the anti-causal part of the channel impulse response and $L_{hc}$ is the length of the causal part of the channel impulse response. A vector b is defined as the reliable trellis decoder decisions on the input symbols of length $L_b$, and is provided by the long traceback 12-phase trellis decoder 44. Also, a Toeplitz matrix B is defined according to the following equation:

$$B = \begin{bmatrix} b_{L_h-1} & b_{L_h-2} & - & - & - & - & b_0 \\ - & b_{L_h-1} & - & - & - & - & - \\ - & - & & & & & - \\ - & - & & & & & - \\ - & - & & & & & b_{L_h-1} \\ - & - & & & & & - \\ - & - & & & & b_{L_b-L_h} & - \\ b_{L_b-1} & b_{L_b-2} & - & - & - & - & b_{L_b-L_h} \end{bmatrix} \quad (19)$$

where the elements are real and consist of the symbol decisions of vector b. To ensure an over determined system of equations, $L_b$ is given by the following inequality:

$$L_b \geq 2L_h - 1 \quad (20)$$

The Toeplitz matrix B is of dimension $(L_b - L_h + 1) \times L_h$ with $(L_b - L_h + 1) \geq L_h$.

The received data vector is y with elements $y_i$ for $L_{hc} \leq i \leq (L_b - L_{ha} - 1)$ where $y_i$ is the received data element corresponding to input symbol decision $b_i$. Typically this correspondence would mean that $y_i$ contains a contribution from $b_i$ multiplied by the maximum magnitude tap weight of h. The received data vector y is given by the following equation:

$$y = Bh + v \quad (21)$$

where h is the $L_h$ long channel impulse response vector and v is a noise vector. The least squares solution for h is given by the following equation:

$$\hat{h}_{LS} = (B^T B)^{-1} B^T y \quad (22)$$

By utilizing reliable trellis decoder input symbol decisions, there is sufficient support for calculating a channel impulse response estimate with the required delay spread. As required by inequality (20), the vector b of symbol decisions must be at least twice as long as the channel impulse response being estimated. The system of equations is sufficiently over determined in order to diminish the adverse affect of additive White Gaussian Noise (AWGN). Therefore, a vector b of symbol decisions that is longer than twice the channel impulse response length is preferred.

The tap weight calculations performed by the tap weight calculator 50 and the tap weight calculator 64 require not only a channel impulse response estimate but also a noise variance estimate. The noise variance may be estimated by calculating an estimate of the received data vector y according to $\hat{y} = A\hat{h}$ where $\hat{h}$ is the latest calculated channel impulse response estimate. Then, the noise variance estimation is given by the following equation:

$$\hat{\sigma}^2 = \frac{\|\hat{y} - y\|^2}{\text{length}(y)} \quad (23)$$

where $\|.\|$ is the 2-norm.

In order to apply the above equations to an 8 VSB receiver, the following parameters may be used as an example: $L_h = 512$, $L_{ha} = 63$, $L_{hc} = 448$, $L_b = 2496$, and $L_n = 704$. The vector b is formed from a sequence of trellis decoder decisions made by the long traceback 12-phase trellis decoder 44 on the input symbols. The delay (31×12=372) of the long traceback 12-phase trellis decoder 44 is not significant compared to a channel impulse response estimate update rate of once per segment. Normally, the long traceback 12-phase trellis decoder 44 would just make output bit pair decisions, but it can also make equally reliable decisions on the input symbols.

The vector b, for example, may be selected as 3 segments ($L_b$=2496 symbols) long. So, three data segments may be used to produce a single channel impulse response estimate update. A new channel impulse response update can be obtained once per segment by proceeding in a sliding window manner. Optionally, several consecutive channel impulse response estimate updates can be averaged in order to further improve channel impulse response accuracy if necessary. This additional averaging can be a problem if the channel impulse response is varying rapidly.

A vector b with fewer than three segments of symbol decisions may be used. However, as stated in inequality (20), the length of the vector b must be at least twice as long as the channel impulse response to be estimated. As previously stated, long b vectors helps to diminish the adverse effects of AWGN.

Certain modifications of the present invention have been discussed above. Other modifications of the present invention will occur to those practicing in the art of the present invention. For example, the decoders 42 and 44 are described above as 12-phase trellis decoders. The use of 12-phase trellis decoders is, for the most part, specific to the digital television application in compliance with the ATSC standard. For other applications, however, decoders other than 12-phase trellis decoders may be used.

Also, as shown above, the short traceback 12-phase trellis decoder 42 is used to feed back symbol decisions to the feedback filter 56. Instead, a data slicer could be used for this purpose.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:
1. A method of operating an equalizer comprising:
   initializing the tap weights of the equalizer in response to a received training sequence;
   successively calculating new tap weights for the equalizer in response to sequences of received symbols and corresponding sequences of decoded symbols without the training sequence, wherein each of the sequences of decoded symbols is longer than the training sequence; and,
   successively applying the calculated new tap weights to the equalizer.
2. The method of claim 1 wherein the successive calculation of new tap weights for the equalizer comprises applying a sliding window to sequences of decoded symbols.
3. The method of claim 1 wherein the received training sequence comprises $L_n$ symbols, wherein each of the sequences of decoded symbols comprises $L_b$ decoded symbols, and wherein $L_b > L_n$.
4. The method of claim 3 wherein $L_b > 3L_n$.
5. The method of claim 4 wherein $L_b = 2496$ decoded data symbols, and wherein $L_n = 704$ training sequence symbols.
6. The method of claim 1 wherein the initializing of the tap weights of the equalizer comprises determining an estimate of a channel based on the training sequence, and wherein the successive calculation of new tap weights for the equalizer comprises determining an estimate of a channel based on the decoded symbols.
7. The method of claim 6 wherein the determining of an estimate of a channel based on the training sequence comprises determining an estimate of the channel based on the following equation:

$$\hat{h}_0 = (A^T A)^{-1} A^T y$$

wherein $\hat{h}_0$ is the channel estimate, wherein A is a matrix based on the training sequence, and wherein y is a received signal vector.
8. The method of claim 7 wherein the matrix A comprises an $(L_n + L_{ha} + L_{hc}) \times L_h$ convolution matrix, wherein $L_n$ is the number of symbols in the training sequence, wherein $L_{ha}$ is the length of the anti-causal part of the impulse response of the channel, wherein $L_{hc}$ is the length of the causal part of the impulse response of the channel, and wherein $L_h = L_{ha} + L_{hc} + 1$.
9. The method of claim 8 wherein the matrix A is stuffed with zeros in addition to the training sequence to achieve the dimension of $(L_n + L_{ha} + L_{hc}) \times L_h$.
10. The method of claim 6 wherein the determining of an estimate of a channel based on the training sequence comprises determining an estimate of the channel based on the following equation:

$$y = Ah + v$$

wherein h is the channel estimate, wherein A is a matrix based on the training sequence, wherein y is a received signal vector, and wherein v is a noise vector.
11. The method of claim 10 wherein the matrix A comprises an $(L_n + L_{ha} + L_{hc}) \times L_h$ convolution matrix, wherein $L_n$ is the number of symbols in the training sequence, wherein $L_{ha}$ is the length of the anti-causal part of the impulse response of the channel, wherein $L_{hc}$ is the length of the causal part of the impulse response of the channel, and wherein $L_h = L_{ha} + L_{hc} + 1$.
12. The method of claim 11 wherein the matrix A is stuffed with zeros in addition to the training sequence to achieve the dimension of $(L_n + L_{ha} + L_{hc}) \times L_h$.
13. The method of claim 6 wherein the determining of an estimate of a channel based on the decoded symbols comprises determining an estimate of the channel based on the following equation:

$$\hat{h}_{LS} = (B^T B)^{-1} B^T Y$$

wherein $\hat{h}_{LS}$ is the channel estimate, wherein B is a matrix based on the decoded symbols, and wherein y is a received signal vector.
14. The method of claim 13 wherein the matrix B comprises an $(L_b - L_h + 1) \times L_h$ convolution matrix, wherein $L_b$ is a number of decoded symbols, wherein $L_b \geq (2L_h - 1)$, wherein $L_h = L_{ha} + L_{hc} + 1$, wherein $L_{ha}$ is the length of the anti-causal part of the impulse response of the channel, and wherein $L_{hc}$ is the length of the causal part of the impulse response of the channel.
15. The method of claim 6 wherein the determining of an estimate of a channel based on the decoded symbols comprises determining an estimate of the channel based on the following equation:

$$y = Bh + v$$

wherein h is the channel estimate, wherein B is a matrix based on the decoded symbols, wherein y is a received signal vector, and wherein v is a noise vector.
16. The method of claim 15 wherein the matrix B comprises an $(L_b - L_h + 1) \times L_h$ convolution matrix, wherein $L_b$ is a number of decoded symbols, wherein $L_b \geq (2L_h - 1)$, wherein $L_h = L_{ha} + L_{hc} + 1$, wherein $L_{ha}$ is the length of the anti-causal part of the impulse response of the channel, and wherein $L_{hc}$ is the length of the causal part of the impulse response of the channel.
17. The method of claim 6 wherein the determining of an estimate of the channel based on the training sequence comprises determining an estimate of the channel based on an over-determined system of equations.
18. The method of claim 17 wherein the determining of an estimate of the channel based on an over-determined system of equations comprises determining an estimate of the channel based on a training sequence padded with zeros.
19. The method of claim 1 wherein the equalizer comprises a feed forward filter, a feed back filter, and a zero delay trellis decoder, wherein the zero delay trellis decoder receives an output derived from the feed forward filter and provides a decoded output to the feed back filter, and wherein the decoded symbols are derived from the output of a long traceback trellis decoder coupled to the output of the feed forward filter.
20. The method of claim 1 wherein each of the sequences of received symbols is more than twice as long as the training sequence.
21. The method of claim 1 wherein each of the sequences of received symbols is more than three times as long as the training sequence.
22. The method of claim 1 wherein the initializing of the tap weights of the equalizer in response to a received training sequence comprises initializing the tap weights of the equalizer in response to a received training sequence without decoded symbols.
23. A decision feedback equalizer system comprising:
   an equalizer having taps with tap weights;
   a decoder that decodes an output of the equalizer to recover decoded data;

a first tap weight calculator that calculates and applies the tap weights to the equalizer based upon a first estimate of a channel impulse response determined from a training sequence; and, a second tap weight calculator that successively calculates and applies the tap weights to the equalizer based upon successive second estimates of a channel impulse response determined from successive sequences of the decoded data without the training sequence, wherein each of the sequences of the decoded data is longer than the training sequence.

24. The decision feedback equalizer system of claim 23 wherein the decoder comprises a long traceback trellis decoder that produces first decoded data, wherein the first decoded data are the decoded data used by the second tap weight calculator.

25. The decision feedback equalizer system of claim 24 wherein the equalizer comprises a decision feedback equalizer, and wherein the decision feedback equalizer comprises:
a short traceback trellis decoder that produces second decoded data;
a feedback filter that filters the second decoded data; and,
a summer that subtracts the filtered second decoded data from the output of a feed forward filter to produce a summer output, the summer output being supplied as inputs to the long traceback trellis decoder and to the short traceback trellis decoder.

26. The decision feedback equalizer system of claim 25 wherein the short traceback trellis decoder has a zero delay.

27. The decision feedback equalizer system of claim 25 wherein the feedback filter and the feed forward filter have tap weights, and wherein the first and second tap weight calculators apply the tap weights to the feedback and feed forward filters.

28. The decision feedback equalizer system of claim 25 further comprising a delay imposed upstream of the second tap weight calculator, wherein the delay matches a delay of the decision feedback equalizer and the long traceback trellis decoder.

29. The decision feedback equalizer system of claim 23 wherein the first tap weight calculator determines the first estimate of the channel impulse response according to the following equation:

$$\hat{h}_0 = (A^T A)^{-1} A^T Y$$

wherein $\hat{h}_0$ is the first estimate, wherein A is a matrix based on the training sequence, and wherein y is a received signal vector.

30. The decision feedback equalizer system of claim 29 wherein the matrix A comprises an $(L_n + L_{ha} + L_{hc}) \times L_h$ convolution matrix, wherein $L_n$ is the number of symbols in the training sequence, wherein $L_{ha}$ is the length of the anti-causal part of the impulse response of the channel, wherein $L_{hc}$ is the length of the causal part of the impulse response of the channel, and wherein $L_h = L_{ha} + L_{hc} 1$.

31. The decision feedback equalizer system of claim 29 wherein the matrix A is stuffed with zeros to substitute for unknown symbols that surround the training sequence.

32. The decision feedback equalizer system of claim 23 wherein the first tap weight calculator determines the first estimate of the channel impulse response according to the following equation:

$$y = Ah + v$$

wherein h is the second estimate, wherein A is a matrix based on the training sequence, wherein y is a received signal vector, and wherein v is a noise vector.

33. The decision feedback equalizer system of claim 32 wherein the matrix A comprises an $(L_n + L_{ha} + L_{hc}) \times L_h$ convolution matrix, wherein $L_n$ is the number of symbols in the training sequence, wherein $L_{ha}$ is the length of the anti-causal part of the impulse response of the channel, wherein $L_{hc}$ is the length of the causal part of the impulse response of the channel, and wherein $L_h = L_{ha} + L_{hc} + 1$.

34. The decision feedback equalizer system of claim 32 wherein the matrix A is stuffed with zeros to substitute for unknown symbols that surround the training sequence.

35. The decision feedback equalizer system of claim 23 wherein the second tap weight calculator determines the second estimate of the channel impulse response according to the following equation:

$$\hat{h}_{LS} = (B^T B)^{-1} B^T Y$$

wherein $\hat{h}_{LS}$ is the second estimate, wherein B is a matrix based on the decoded data, and wherein y is a received signal vector.

36. The decision feedback equalizer system of claim 32 wherein the matrix B comprises an $(L_b - L_h + 1) \times L_h$ convolution matrix, wherein $L_b$ is a number of decoded data, wherein $L_b \geq (2L_h - 1)$, wherein $L_h = L_{ha} + L_{hc} + 1$, wherein $L_{ha}$ is the length of the anti-causal part of the impulse response of the channel, and wherein Lhc is the length of the causal part of the impulse response of the channel.

37. The decision feedback equalizer system of claim 23 wherein the second tap weight calculator determines the second estimate of the channel impulse response according to the following equation:

$$y = Bh + v$$

wherein h is the second estimate, wherein B is a matrix based on the decoded data, wherein y is a received signal vector, and wherein v is a noise vector.

38. The decision feedback equalizer system of claim 37 wherein the matrix B comprises an $(L_b - L_h + 1) \times L_h$ convolution matrix, wherein $L_b$ is a number of decoded data, wherein $L_b \geq (2L_h - 1)$, wherein $L_h = L_{ha} + L_{hc} + 1$, wherein Lha is the length of the anti-causal part of the impulse response of the channel, and wherein $L_{hc}$ is the length of the causal part of the impulse response of the channel.

39. The decision feedback equalizer system of claim 23 wherein each of the sequences of received symbols is more than twice as long as the training sequence.

40. The decision feedback equalizer system of claim 23 wherein each of the sequences of received symbols is more than three times as long as the training sequence.

41. A method of operating an equalizer comprising:
initializing the tap weights of the equalizer in response to a training sequence, wherein the training sequence is derived from a frame sync segment of an ATSC compliant frame;
successively calculating new tap weights for the equalizer in response to sequences of decoded symbols, wherein each sequence of decoded symbols includes the symbols in n data segments of the ATSC compliant frame, and wherein n>1; and,
successively applying the calculated new tap weights to the equalizer.

42. The method of claim 41 wherein each successive calculation of new tap weights is made following each sequence by dropping the symbols of the oldest segment and adding the symbols of the segment just received.

43. The method of claim 41 wherein n=3.

44. The method of claim 41 wherein decoded symbols in each sequence=2496 data symbols, and wherein training sequence=704 training sequence symbols.

45. The method of claim 41 wherein the initializing of the tap weights of the equalizer comprises determining an estimate of the channel based on the following equation:

$$\hat{h}_0 = (A^T A)^{-1} A^T Y$$

wherein $\hat{h}_0$ is the channel estimate, wherein A is a matrix based on the training sequence, and wherein y is a received signal vector.

46. The method of claim 45 wherein the matrix A comprises an $(L_n + L_{ha} + L_{hc}) \times L_h$ convolution matrix, wherein $L_n$ is the number of symbols in the training sequence, wherein $L_{ha}$ is the length of the anti-causal part of the impulse response of the channel, wherein $L_{hc}$ is the length of the causal part of the impulse response of the channel, and wherein $L_h = L_{ha} + L_{hc} + 1$.

47. The method of claim 46 wherein the matrix A is stuffed with zeros in addition to the training sequence to achieve the dimension of $(L_n + L_{ha} + L_{hc}) \times L_h$.

48. The method of claim 41 wherein the successive calculation of new tap weights for the equalizer comprises determining an estimate of the channel based on the following equation:

$$\hat{h}_{LS} = (B^T B)^{-1} B^T Y$$

wherein $\hat{h}_{LS}$ is the channel estimate, wherein B is a matrix based on the decoded symbols, and wherein y is a received signal vector.

49. The method of claim 48 wherein the matrix B comprises an $(L_b - L_h + 1) \times L_h$ convolution matrix, wherein $L_b$ is a number of decoded symbols, wherein $L_b \geq (2L_h - 1)$, wherein $L_h = L_{ha} + L_{hc} + 1$, wherein $L_{ha}$ is the length of the anti-causal part of the impulse response of the channel, and wherein $L_{hc}$ is the length of the causal part of the impulse response of the channel.

50. The method of claim 41 wherein the initializing of the tap weights of the equalizer comprises determining an estimate of the channel based on an over-determined system of equations.

51. The method of claim 50 wherein the successive calculation of new tap weights for the equalizer comprises determining an estimate of the channel based on a number of decoded symbols that is larger than the number of symbols in the training sequence.

52. A method of operating an equalizer comprising:
calculating first tap weights for the equalizer based on a number a of received symbols, wherein the received symbols used in calculating the first tap weights include training symbols;
applying the calculated first tap weights to the equalizer;
successively calculating second tap weights for the equalizer, wherein each of the successive calculations is based on a number b of received symbols and a number c of decoded symbols without the training symbols, wherein a<b, and wherein b=c; and,
successively applying the calculated second tap weights to the equalizer.

* * * * *